United States Patent Office 3,565,895
Patented Feb. 23, 1971

3,565,895
HEXAHYDROTRIAZINES
Fred L. Johnson, Jr., Austin, Tex., assignor to Jefferson Chemical Company, Inc., Houston, Tex., a corporation of Delaware
No Drawing. Continuation-in-part of application Ser. No. 589,814, Oct. 27, 1966. This application Sept. 11, 1969, Ser. No. 857,224
Int. Cl. C07d 55/14
U.S. Cl. 260—248                                 3 Claims

ABSTRACT OF THE DISCLOSURE

New compounds of the following general formula are disclosed:

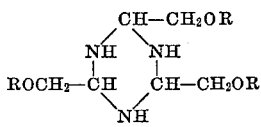

wherein R is an alkyl or aryl group containing 1 to 16 carbon atoms. These substituted hexahydrotriazines are useful in the preparation of textile treating resins, plasticizers for synthetic organic resins, and as a cross-linker for polyurethane elastomers.

CROSS-REFERENCE TO RELATED APPLICATIONS

This application is a continuation-in-part of copending application Ser. No. 589,814, filed Oct. 27, 1966, now abandoned.

DESCRIPTION OF THE INVENTION

This invention relates to a new class of hexahydrotriazines and to the synthesis thereof. More particularly, this invention relates to a new class of substituted hexahydrotriazines and to a method for the synthesis of the compounds from ammonia and substituted acetaldehydes. These new hexahydrotriazines are useful in the preparation of textile treating resins such as aminoplasts, as plasticizers for synthetic organic resins, and as a cross-linker for polyurethane elastomers.

The present invention is directed to a new class of substituted hexahydrotriazines having the general formula:

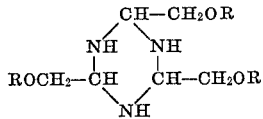

wherein R is an alkyl or aryl group containing 1 to 16 carbon atoms. The compounds of the present invention are prepared from ammonia and substituted acetaldehydes of the general formula:

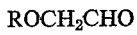

ROCH₂CHO wherein R has the meaning given above.

Representative substituted acetaldehydes that may be used as raw materials for the practice of the present invention include materials such as methoxyacetaldehyde, ethoxyacetaldehyde, propoxyacetaldehyde, butoxyacetaldehyde, tridecoxyacetaldehyde, nonoxyacetaldehyde, cyclohexoxyacetaldehyde, phenoxyacetaldehyde, toloxyacetaldehyde, naphthoxyacetaldehyde, etc., and mixtures thereof.

The substituted acetaldehyde starting material of the present invention is reacted with ammonia in solution in an organic solvent. Although water may be used as a solvent, it is generally preferable to employ an organic solvent, because the hexahydrotriazine products of the present invention have high solubility in water which makes their recovery from aqueous solution difficult, though not impractical. The organic solvents that may be employed are polar organic solvents such as alcohols and ketones (e.g., methanol, ethanol, propanol, butanol, acetone, methyl ethyl ketone, etc.).

The hexahydrotriazine products of the present invention involve the reaction of the substituted acetaldehyde with an equal molar amount of ammonia. However, it is generally preferable to employ excess ammonia in order to insure that the reaction is brought to completion. Although less than an equimolar amount of ammonia may be employed, this generally results in incomplete conversion. Accordingly, it is generally preferable to use from about 0.5 to about 50 mols or more of ammonia (and more preferably from about 1 to 5 mols) per mol of substituted acetaldehyde. The ammonia may be employed as such as anhydrous ammonia or may be employed as ammonium hydroxide. In general, the best results are obtained with anhydrous ammonia.

The substituted acetaldehyde starting materials may be used as such or may be charged to the process in the form of concentrated aqueous or organic solutions thereof. The reaction is preferably conducted at a temperature of less than about 50° C., although any suitable reaction temperature within the range from about 0° to about 75° C. may be employed.

The invention will be illustrated by the following specific examples which are given by way of illustration and not as limitations on the scope of this invention.

EXAMPLE I

Nine hundred eighty-eight grams of 75% methoxyacetaldehyde (equivalent to 10 mols methoxyacetaldehyde) was placed in an ice-cooled resin flask fitted with a mechanical stirrer, a sparging tube and a thermometer. After addition of 155 grams methanol, anhydrous ammonia was sparged into the stirred solution for six hours, keeping the temperature no higher than 49° C. During this period the solution took up 267 grams or 15.7 mols of ammonia, part of which was merely dissolved and had not reacted. After ammonia addition was stopped, the white crystals were filtered without additional chilling of the reaction mixture and, after drying three hours under vacuum at 20–30° C., 665 grams of product was obtained for a 91% yield of initial crystals. The filtrate was then chilled in Dry Ice-acetone and again filtered.

An additional 76 grams of dried product was obtained which, together with the virgin crop of crystals, gave a total product recovery before recrystallization of 748 grams or 102% of the theoretical yield. Recrystallization was done in methanol or ethanol.

Characterization of the compound was made by elemental analysis, by equivalent weight and by molecular weight. The structure was then confirmed by infrared spectrophotometry and by nuclear magnetic resonance spectroscopy. Results of the characterization study are shown in the following table:

|  | Percent |  |  | Molecular weight | Equivalent weight | Melting point, ° C. |
|---|---|---|---|---|---|---|
|  | C | H | N |  |  |  |
| Found | 49.0 | 9.85 | 18.2 | 238 | 80 | 79–80 |
| Calculated | 49.3 | 9.65 | 19.2 | 219 | 73 |  |

Percent carbon and hydrogen were found by the combustion procedure, percent nitrogen was found by the Kjeldahl nitrogen method, the molecular weight was found by vapor pressure osmometry and the equivalent weight was found by titration with standard hydrochloric acid.

Infrared studies, both as a melt and as a mineral oil mull, showed the $CH_3$—O—R band at 8.3 microns, showed the ether band in the 9 micron region and showed the NH bands at about 3 microns and again at 12–13 microns.

Nuclear magnetic resonance studies made in deuterated acetone $$[(CD_3)_2CO]$$

showed $CH_3$—O— at 3.3 p.p.m. (using tetramethylsilane as an internal standard), but did not show any $CH_3$ groups attached to carbon atoms. The $CH_2$ groups attached to the ring CH groups were evident at 3.4 p.p.m. No $CH_2$ groups were found adjacent to $CH_3$ groups. The ring CH groups were found as a triplet at 3.8 p.p.m., and the ring NH groups were found as a singlet at 1.8 p.p.m.

EXAMPLE II

In a manner similar to that described in Example I, another new compound, 2,4,6-tris(ethoxymethylene)hexahydro-s-triazine, was prepared from ethoxyacetaldehyde and excess anhydrous ammonia according to the following equation:

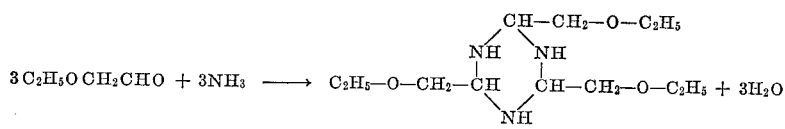

Quantitative yield data was not determined, but the bulk of crystals obtained from the same number of mols of aldehyde indicated that the yield was very similar to that obtained in Example I. Recrystallization was done in acetone in which the material was somewhat less soluble than in alcohols.

Characterization and structure determinations were made in the same manner as show in Example I. Results of the characterization studies are shown in the following table:

|  | Percent | | | Molecular weight | Equivalent weight | Melting point, °C. |
|---|---|---|---|---|---|---|
|  | C | H | N |  |  |  |
| Found | 52.6 | 11.1 | 15.1 | (¹) | 94 | 70–71 |
| Calculated | 55.1 | 10.4 | 16.1 | 261 | 87 |  |

¹ Not determined.

Infrared studies made as described in Example I showed the NH bands at 3 microns and again at 12–13 microns. Ether-oxygen bonds showed in the 9 micron region, and the $C_2H_5$—O—R band was evident at 7.4 microns.

Nuclear magnetic resonance studies made as in Example I showed the methyl protons of the $C_2H_5$—O groups at about 1.2 p.p.m. The $CH_2$ groups in the $CH_3CH_2$ groups were seen as a quartet at 3.5 p.p.m. The $CH_2$ groups adjacent to the ring CH groups were seen separately as a doublet with a smaller coupling constant than the $CH_2$ groups in the ethyl groups. The ring CH groups were found as a triplet at 3.8 p.p.m., and the ring NH groups were found as a singlet at 2.1 p.p.m.

EXAMPLE III

When butoxyacetaldehyde is reacted with anhydrous ammonia in methanol solution in the manner described above with respect to Example I, equivalent results are obtained, the product in this instance being 2,4,6-tris(butoxymethylene)hexahydro-s-triazine. Equivalent results are also obtainable when the feedstock is phenoxyacetaldehyde, the reaction product in this case being 2,4,6-tris(phenoxymethylene)hexahydro-s-triazine.

The utility of the compounds of my invention as a cross-linker of a polyurethane elastomer is demonstrated by the following example.

EXAMPLE IV

A triazine formed from methoxyacetaldehyde and ammonia, 2,4,6 - tris(methoxymethylene)hexahydro-s-triazine prepared as in Example I was used as a cross-linker in a polyurethane elastomer formulation. The properties of the elastomer containing the cross-linker were compared with an elastomer absent the cross-linker.

In preparing the elastomers a polyoxypropylenepolyoxyethylene diol having a molecular weight of 4,000 and 50% primary hydroxy groups was mixed with a clay filler. To a portion of this mixture was added 2,4,6-tris(methoxymethylene)hexahydro-s-trizaine. With both portions was mixed a phenylmercuric acetate catalyst. The viscosity at 25° C. of the mixture containing the hexahydrotriazine was 5,000 cps. as opposed to 6,000 cps. for the mixture absent the hexahydrotriazine. These mixtures were reacted with an amount of a polymethylenepolyphenylisocyanate having a functionality of 2.7 to 2.8 sufficient to provide a ratio of isocyanate groups to hydroxyl groups of 1:10. The elastomer was cured and tested.

The formulation and properties of the elastomer are as follows:

|  | Run Number | |
|---|---|---|
|  | A | B |
| Formulation, p.p.h.: |  |  |
| Diol | 65.0 | 59.2 |
| Burgess No. 30 clay filler | 30.1 | 30.1 |
| 2,4,6-tris(methoxymethylene)-hexahydro-s-triazine | None | 2.1 |
| Phenylmercuric acetate catalyst | 0.31 | 0.31 |
| Polyisocyanate | 4.6 | 8.3 |
| Properties: |  |  |
| NCO/OH | 1.10/1.00 | 1.10/1.00 |
| Curing temperature, °C | 25 | 25 |
| Hardness, Shore A,, ASTM D2240-64T | 39–40 | 55–57 |
| Tensile strength, p.s.i., ASTM D412-64T, die C | 436 | 738 |
| 100% modulus, p.s.i., ASTM D412-64T, die C | 253 | 593 |
| Elongation, percent ASTM D412-64T, die C | 242 | 143 |
| Compression strength at 10% deflection, p.s.i., ASTM D575-46, method A | 60 | 118 |

The above results show that the elastomer employing the hexahydrotriazine had improved hardness, tensile strength and compression strength.

I claim:

1. A compound having the formula

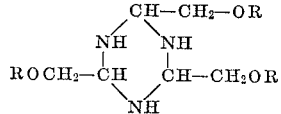

wherein R is selected from the class consisting of alkyl having from 1 to 16 carbon atoms, phenyl, tolyl, and naphthyl.

2. 2,4,6-tris(methoxymethylene)hexahydro-s-triazine.
3. 2,4,6-tris(ethoxymethylene)hexahydro-s-triazine.

References Cited

UNITED STATES PATENTS 3,065,232  11/1962  George _____ 260—248
3,317,603  5/1967  Blance et al. _____ 260—248

JOHN M. FORD, Primary Examiner

U.S. Cl. X.R.

260—30.2, 77.5; 252—8.8